April 20, 1965   J. S. OLES   3,178,952
FABRICATED HUB CONSTRUCTION AND METHOD OF MANUFACTURE
Filed May 24, 1961   3 Sheets-Sheet 1

INVENTOR.
JOHN S. OLES
BY
WILSON, SETTLE & CRAIG
ATTORNEYS

April 20, 1965  J. S. OLES  3,178,952
FABRICATED HUB CONSTRUCTION AND METHOD OF MANUFACTURE
Filed May 24, 1961  3 Sheets-Sheet 2

INVENTOR.
JOHN S. OLES
BY
WILSON, SETTLE & CRAIG
ATTORNEY

April 20, 1965      J. S. OLES      3,178,952
FABRICATED HUB CONSTRUCTION AND METHOD OF MANUFACTURE
Filed May 24, 1961      3 Sheets-Sheet 3

INVENTOR.
JOHN S. OLES
BY
WILSON, SETTLE & CRAIG
ATTORNEYS

United States Patent Office 3,178,952
Patented Apr. 20, 1965

3,178,952
FABRICATED HUB CONSTRUCTION AND
METHOD OF MANUFACTURE
John S. Oles, 15035 Prevost, Detroit, Mich.
Filed May 24, 1961, Ser. No. 112,299
7 Claims. (Cl. 74—230.3)

This invention relates to a fabricated hub and more particularly to a unique hub structure which is formed, assembled and finish-machined in one stroke of a press, and to a method for producing fabricated hubs.

Heretofore, in the production of hubs for use with pulleys and similar rotatable devices, such as gears and the like, it has been a common practice to form such hubs by casting from metals such as iron and steel. Disadvantages of cast iron and steel structures, however, are that they are of unduly high weight and of course do not have the strength of forgings or stampings.

Hubs also have been formed by stamping components thereof and fastening the components together as by bolts or rivets. Also assembly has been effected by press fitting the bushing component of the hub into a bore of a flange member. Disadvantages of the pressed and fastened structures reside in the numerous parts comprising the structures and the necessity for assembling the parts and fastening them together in separate operations as by bolting, riveting or the like. Disadvantage of structures wherein the bushing is merely press fitted into the flange member is that the bushing may be axially displaced from the flange. This requires that the press fitted bushing be brazed or welded into position to assure its retention in place. This of course necessitates an extra step which raises the cost of the item.

Accordingly a step forward in the art of fabricated hub constructions would be provided by the production of a hub assembly wherein the parts are assembled and retained against axial as well as torsional displacement from each other, in a single operation.

It is therefore an important object of the present invention to provide a novel fabricated hub structure wherein the shaft engaging bushing thereof is retained against axial displacement from the flanged cup thereof by an interlocking relationship of the metal forming these parts.

An additional object of the present invention is to provide a method for producing a novel fabricated hub structure wherein the parts are interlocked against axial displacement from each other by a unique dovetailed interlocking relationship of the parts.

A further object of the present invention is to provide a novel fabricated hub structure comprising a split inner sleeve carried within a stamped cup, the parts being interlocked in dovetailed relationship with each other to resist axial displacement thereof, and wherein the split sleeve provides a keyway in the assembly.

A further object is to provide a method for die forming a fabricated hub structure wherein an inner sleeve is locked into a dovetailed engagement with an outer flange member by application of sufficient pressure upon the parts to cause them to attain a state of plastic flow and assume the interlocking dovetailed relationship and wherein all parts are press machined to finished dimension by a single press stroke.

Another object is to provide a method for press machining a fabricated hub wherein the metal parts are simultaneously assembled, finished and work-hardened in one stroke of a press to provide a structure having superior gripping power when press fitted on a shaft.

Still another object of the present invention is to provide a method for fabricating a hub by press machining wherein the hub is completely formed by one stroke of a press, the hub ends being flattened and squared with the flange and the central bore being trued and squared with the flange.

Other objects of this invention will appear in the following description and appended claims, reference being had to the accompanying drawings forming a part of this specification wherein like reference characters designate corresponding parts in the several views.

In the drawings:

FIGURE 1 of the drawings is a section view of a die drawn flanged cup utilized in producing the novel hub structure of the present invention;

Broadly, the present invention relates to a hub structure of unique configuration and to a method for making the same wherein the inner sleeve of the hub and the outer flanged cup-like part thereof are interlocked with each other against axial displacement by a unique dovetailed relationship of the parts by a die or press forming operation wherein the parts are subject to sufficient pressure so that they attain a state of plastic flow to be deformed into the dovetailed interlocking relationship with each other.

Figure 1:
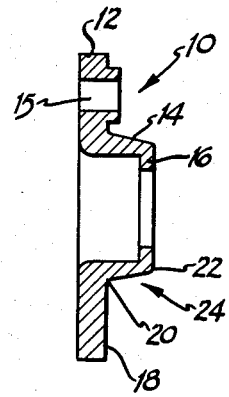

As shown in FIGURE 1 of the drawings, a stamped metal cup 10 is formed from a circle of sheet steel having an original thickness equal to the thickness of radially extending flange 12. As the plate is drawn out during the stamping or dieing operation, the wall 14 defining a cup-like structure is gradually reduced from the thickness of flange 12 to the thickness at the inwardly extending flange 16. The press operation is effected utilizing a die of straight cylindrical configuration having a diameter equal to the inside diameter of the wall 14. The flange element 12 is retained on a die along the surface 18 up to the radius 20. From the inner radius 20 to the outer radius 22 the outer portion of the wall 14 is not supported and accordingly during the pressing and thinning operation it develops an inward taper along the area indicated by the arrow 24.

The flange 12 is provided with tapped holes 15 for attachment as by bolting to a pulley or the like.

Figure 2:
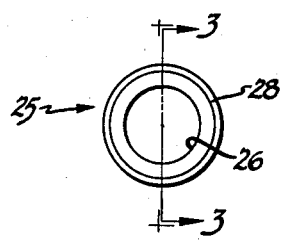
FIGURE 2 is a bottom plan view of a bushing forming a part of the fabricated hub structure of the present invention.
Figure 3:
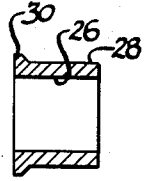
FIGURE 3 is a section view taken along line 3—3 of FIGURE 2.

As shown in FIGURES 2 and 3 of the drawing a bushing 25 of generally tubular configuration having a cylindrical bore 26 and a parallel, cylindrical outer surface 28 is provided with a preformed flange 30. The outer surface 28 is of a diameter very slightly smaller than the inside diameter of the cup defining wall 14 to slidably fit therein.

Figure 4:
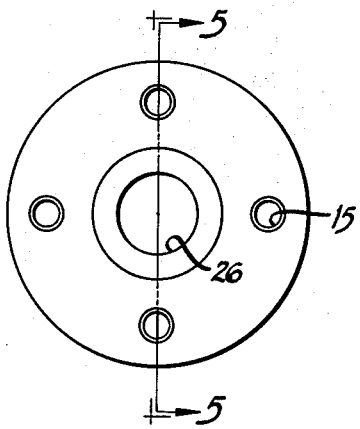
FIGURE 4 is a top plan view of a circular fabricated hub structure made in accordance with the present invention.
Figure 5:
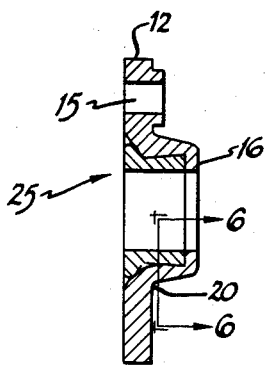
FIGURE 5 is a section view taken along line 5—5 of FIGURE 4.
Figure 6:
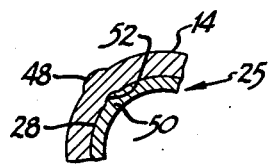
FIGURE 6 is a section view taken along the line 6—6 of FIGURE 5.
Figure 7:
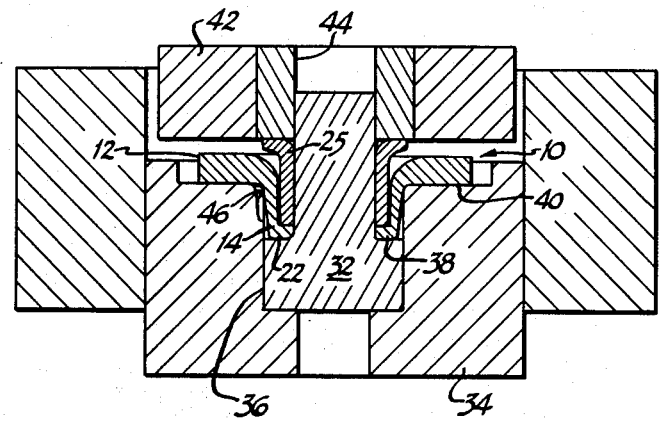
FIGURE 7 is a section view through a fabricating die utilized to form hubs in accordance with the present invention, showing a bushing inserted into a flanged cup prior to application of pressure.
Figure 8:
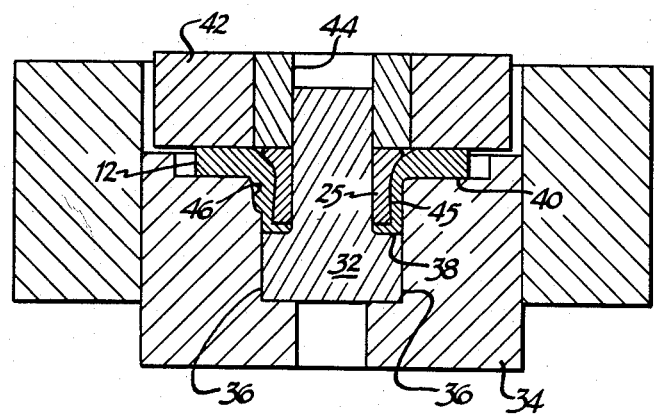
FIGURE 8 is a section view similar to FIGURE 7 after the die has moved to force the parts into dovetailed interlocking relationship with each other.

The finished hub assembly is illustrated in FIGURES 4, 5 and 6 and the method by which the sleeve 25 is retained within the stamped metal cup 10 is illustrated in FIGURES 7 and 8.

As shown in FIGURES 7 and 8 a forming die for use in the method of the present invention includes a central pin member 32 and an annular supporting die block 34 having a cylindrical recess 36 coaxially thereof for receipt of the central die pin 32. The die pin 32 is provided with a shoulder 38 and as shown in FIGURE 7 the formed cup 10 of FIGURE 1 is fitted down over the pin 32 to rest upon the shoulder 38, the flange 12 of the stamped metal cup 10 resting upon a horizontally disposed shoulder 40 of die block 34. The annular bushing 25 of FIGURES 2 and 3 is then inserted over the pin 32 within the cup 10. Thereafter an upper die member 42 having a central aperture 44 adapted to fit around the pin 32 is moved downwardly to the position shown in FIGURE 8.

As the die is moved downwardly, sufficient pressure is developed to force the sleeve 25 down into the cup 10 so that both the metal in the sleeve and the metal of the cup attain a state of plastic flow. The metal in the wall 14 of the stamped metal cup 10 at the radius 22, FIGURE 1 is forced outwardly to be restrained by the die member 34 so that it assumes a cylindrical outer configuration. During this operation the metal of the sleeve is also caused to be thickened and forced outwardly following the inner contour assumed by the wall 14 of the stamped metal cup 10. Thus a dovetailed interlock 45 is formed between the parts whereby they are thereafter permanently retained against axial displacement from each other.

It should be pointed out that during this one stroke of the press, the parts are not only assembled but they are also "press machined" to finish dimensions. Thus the entire hub assembly is completely formed by one stroke of the press, the hub ends are aligned flat and square with the flange, and the central bore is aligned true and square with the flange. Also, the bore is sized out to an accurate dimension.

It should also be pointed out that during the assembly process, the metal of both the sleeve 25 and the stamped metal cup 10 is "cold worked" or "work hardened" and its yield point or elastic limit is thereby raised so that its gripping power under conditions of press fit on a shaft is increased double or more over a comparable sized hub made of low carbon steel in its original soft condition.

*Torsional Interlock*

While the above described operation has provided a unique method of retaining two interfitted hub parts against axial displacement, rotary or torsional displacement of the parts with respect to each other is also provided by the one stroke of the press during the assembly and press machining operation. This torsional slipping resistance can be imparted by several means; however, for purposes of conciseness two features will be described. As shown in FIGURE 6, four torsional interlocks are provided by means of cooperating grooves formed between the outer periphery of the outer surface 28 of the bushing 25 and the inside of wall 14 of the stamped metal cup 10. To provide these interlocking grooves, relief portions are provided in the die member 34 at the points 46, FIGURE 8. Thus during the pressing operation, the metal of the cup 10 is permitted to flow outwardly into the relief portions 46 as shown in FIGURE 6 to provide small bosses 48 at the inner radius 20, FIGURE 1, of the cup 10. As the metal of the cup at radius 20 flows outwardly, the metal of the sleeve 25 follows it to form an interlocking projection 50 on the outer surface 28 of the bushing 25 that projects into a groove 52 formed on the inner surface of the wall 14 of the metal cup 10 as the metal thereof moves outwardly into the relieved portion 46 of the die member 34.

Thus the parts of the hub assembly are restrained against axial displacement from each other and also restrained against torsional displacement from each other.

Another method of restraining the sleeve 25 against torsional displacement with respect to the stamped metal cup 10 comprises forming a knurl on the outside of the sleeve 25 so that when the sleeve is pressed into the cup in cold plastic flowing relation therewith, the knurl is imparted to the inner side of the wall 14 of the cup 10 to form an interlocking engagement.

Still another method of restraining the sleeve 25 against torsional displacement with respect to the stamped metal cup 10 comprises forming on the exterior of the sleeve any configuration of projections equivalent to the knurl mentioned above. Thus one or more knurl-like projections can be utilized on the outer surface of the bushing to impart their configuration to the wall 14 of the cup 10 when the pieces are pressed together.

*A related aspect of the present invention*

The foregoing discussion has related to the use of a solid bushing being pressed into an outer stamped metal cup in such a manner that the parts are locked in dovetailed relationship and thereby prevented from being axially displaced from each other. However, it is also to be included within the scope of the invention to use a split bushing and thus provide a method of making a keyway during the stamping operation. It should be pointed out that the dovetailing feature described above is utilized to hold the split bushing in place in the same manner as for the solid bushing described and the torsional displacement resistance is also provided as described. However, in this aspect of the invention, a die pin having a key formed axially along its periphery is utilized over which a split bushing is positioned for the forming operation.

Figure 10:
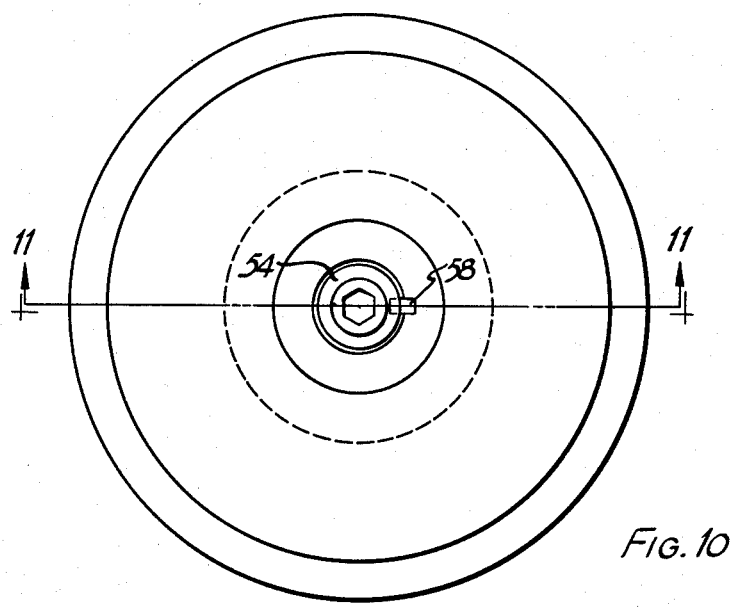
FIGURE 10 is a top plan view of a press-machining die employed to assemble and form a hub similar to that shown in FIGURE 9.
Figure 11:
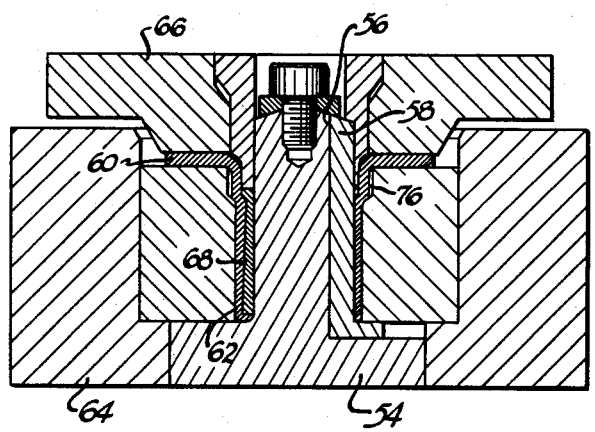
FIGURE 11 is a section view taken along the line 11—11 of FIGURE 10.
Figure 9:
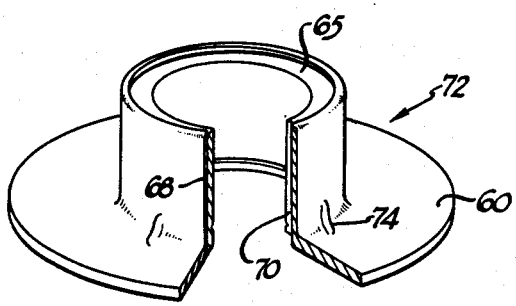
FIGURE 9 is a perspective view of a fabricated hub structure made in accordance with the present invention and having a keyway therein.

To further illustrate this embodiment of the invention, reference will now be made to FIGURES 9, 10 and 11 of the drawings which illustrate the formation of a hub having a keyway formed in the inner wall or bore thereof, and having a dovetail interlock as described above. As shown in FIGURES 10 and 11, a central die pin 54 is provided with an axially extending recess 56 in its periphery, into which a key 58 is secured. A pressed cup 60 is first positioned within a cavity 62 of a die member 64 with the central die pin 54 projecting upwardly therethrough. The split bushing 65 is then positioned upon the central die pin 54 in straddling relationship to the key 58. Thereafter, in the manner described in FIGURES 7 and 8, the upper press member 66 is moved downwardly under sufficient pressure to cause the bushing and cup to attain a plastic flow relationship to form the dovetailed interlock 68 as shown in FIGURE 11 of the drawings. As shown by the broken perspective view of FIGURE 9, a keyway 70 is formed within the bore of the hub assembly 72 when the key 58 of the die pin 54 is removed after the pressing operation is complete.

As in the foregoing embodiment of the invention, the split bushing 65 is restrained against torsional movement with respect to the pressed cup 60 by means of projections 74 formed by the metal of the cup 60 flowing into relief portion 76, FIGURE 11, formed within the cavity 62 of the die 64. This causes the same type of interlocking relationship between the bushing 65 and the cup 60 as is shown in the parts illustrated in FIGURE 6.

Thus in this embodiment of the invention, by one stroke of a press, a hub assembly is formed complete with a keyway wherein the bushing and cup components of the hub assembly are locked into dovetailed engagement with each other and thus restrained against axial displacement and are further locked into engagement with each other against torsional displacement.

Materials of construction

The hub assemblies made in accordance with the present invention are fabricated from sheet steel such as hot rolled plate which, under the pressures developed in a press operation is effective to achieve a state of plastic flow to be formed into a dovetailed interlocking relationship and to have all parts and surfaces aligned with each other during said pressing operation. Although hot rolled steel has been utilized it is to be considered within the scope of the invention to utilize other metals displaying similar plastic flow properties.

Advantages of the present invention

In accordance with the present invention, a hub assembly of superior gripping power, when press fitted on a shaft, is provided wherein the parts are constrained against axial displacement and torsional displacement with respect to each other in a single stroke of a press. Additionally, the parts become work hardened during the plastic flow in the press. Still further, the parts are completely finish machined by the press operation, all parts being flat and square and in proper aligned relationship of each other.

I claim:

1. In a fabricated hub, an outer member having a generally tubular wall, a sleeve positioned within said wall, said sleeve and wall each being cold metal flowed into interlocking dovetailed relationship against axial displacement, and means preventing torsional displacement of said sleeve and wall.

2. In a hub structure,
a ductile cup having a generally cylindrical side wall with a bore tapering from a point intermediate the ends outwardly toward each end,
a split sleeve of ductile material within said cup wall forming a keyway,
and said sleeve having its outer surface intimately engaging the interior of said cup wall.

3. In a hub structure,
a cup having a tubular wall of substantially straight cylindrical outer configuration and a bore tapering from a point intermediate the ends outwardly to each end,
a split sleeve in said cup forming an axial keyway,
and said sleeve having its outer periphery intimately conforming to the bore of said cup.

4. In a hub structure,
a stamped ductile metal cup having one end partially closed by a radially inwardly extending flange,
a ductile metal sleeve in said cup,
said cup and sleeve being in axially interlocked relation,
and said sleeve and the radially inwardly extending flange of the cup having a common internal diameter.

5. In a hub structure,
a cup having a tubular wall tapering in thickness from one end toward the other,
a radially outwardly extending flange at the thicker end of said tubular wall,
a radially inwardly extending flange at the thinner end of said wall and partially closing the thinner end of said tubular wall,
a portion of reduced internal diameter between said inwardly extending flange and the other end of said cup,
a tubular sleeve within said tubular wall between said inwardly extending flange and the other end of said cup,
said sleeve having an outer periphery intimately conforming to the inner periphery of said tubular wall,
and said tubular sleeve having a coaxial bore.

6. In a hub structure,
a tubular cup having an axially extending portion intermediate a radially inwardly extending flange at one end and a radially outwardly extending flange at the other end,
the interior of said cup having a portion of reduced diameter intermediate the juncture of said axially extending portion and the inward flange at one end and the outwardly extending flange at the other end and smaller than the axially extended portion adjacent to the inwardly extending flange, and the axially extending portion adjacent to the other end having the outwardly extending flange,
a sleeve in said cup extending from said inward flange to the other end and having its periphery formed in mating relation with said interior of said cup,
and the interior of said sleeve being of cylindrical configuration.

7. In a hub structure,
a tubular cup having one end partially closed by a radially inwardly extending flange and having a wall of axially tapering thickness from one end to the other and a bore having an axially extending portion of reduced diameter intermediate the ends, said reduced diameter portion being of lesser diameter than the juncture of the axially extending portion and the inwardly extending flange at one end and the internal diameter of the axially extending portion at the other end,
a tubular sleeve in intimate engagement with the interior of said wall,
and said sleeve having a cylindrical bore aligned with said radially inwardly extending flange.

References Cited by the Examiner

UNITED STATES PATENTS

| 957,974 | 5/10 | Layne | 308—237 |
|---|---|---|---|
| 1,027,835 | 5/12 | Gale | 74—230.4 |
| 1,076,605 | 10/13 | Reston | 74—230.4 |
| 1,902,223 | 3/33 | Eksergian | 29—159.3 |
| 1,906,578 | 5/33 | Grotnes | 29—159.3 |
| 1,998,653 | 4/35 | Briegel | 285—382.2 |
| 2,495,459 | 1/50 | Kessler | 74—230.3 |
| 2,806,379 | 9/57 | Haracz | 74—230.3 |
| 3,005,259 | 10/61 | Benya et al. | 29—522 |

FOREIGN PATENTS 886,953  7/43  France.

DON A. WAITE, *Primary Examiner.*
MILTON KAUFMAN, *Examiner.*